(12) United States Patent
Perlman

(10) Patent No.: US 7,660,423 B2
(45) Date of Patent: Feb. 9, 2010

(54) METHOD AND APPARATUS FOR MAINTAINING EPHEMERAL KEYS IN LIMITED SPACE

(75) Inventor: Radia J. Perlman, Sammamish, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 758 days.

(21) Appl. No.: 11/325,203

(22) Filed: Jan. 3, 2006

(65) Prior Publication Data

US 2008/0016352 A1 Jan. 17, 2008

(51) Int. Cl.
*H04L 9/08* (2006.01)

(52) U.S. Cl. .................. 380/286; 380/281; 380/282; 726/9

(58) Field of Classification Search .......... 726/9, 726/20; 713/171; 380/30, 286
See application file for complete search history.

(56) References Cited

U.S. PATENT DOCUMENTS

| | | | | |
|---|---|---|---|---|
| 6,959,390 | B1 * | 10/2005 | Challener et al. ............ | 713/194 |
| 7,409,545 | B2 * | 8/2008 | Perlman ....................... | 713/164 |
| 7,493,661 | B2 * | 2/2009 | Liu et al. ..................... | 726/28 |
| 2002/0023215 | A1 * | 2/2002 | Wang et al. .................. | 713/171 |
| 2002/0090091 | A1 * | 7/2002 | Ng et al. ...................... | 380/286 |
| 2007/0157032 | A1 * | 7/2007 | Paganetti et al. ............ | 713/193 |

FOREIGN PATENT DOCUMENTS

WO WO 0229516 A2 * 4/2002

OTHER PUBLICATIONS

Publication: "*A Revocable Backup System*" by Boney and Lipton, In Proceedings 6th Usenix Security Conference, pp. 91-96, 1996.

* cited by examiner

*Primary Examiner*—Kambiz Zand
*Assistant Examiner*—Michael Guirguis
(74) *Attorney, Agent, or Firm*—Park, Vaughan & Fleming LLP

(57) ABSTRACT

One embodiment of the present invention provides a system that maintains keys using limited storage space on a computing device, such as a smart card. During operation, the system receives a request at the computing device to perform an operation involving a key. While processing the request, the system obtains an encrypted key from remote storage located outside of the computing device, wherein the encrypted key was created by encrypting the key along with an expiration time for the key. Next, the system decrypts the encrypted key to restore the key and the expiration time, wherein the encrypted key is decrypted using a computing-device key, which is maintained locally on the computing device. Finally, if the expiration time has not passed, the system uses the key to perform the requested operation. Note that by storing the encrypted key in remote storage, the computing device is able to use the key without consuming local storage space to store the key.

22 Claims, 4 Drawing Sheets

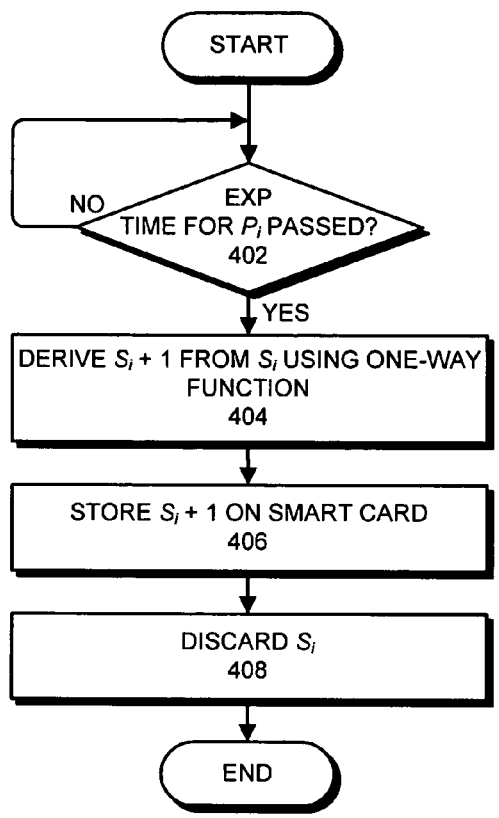
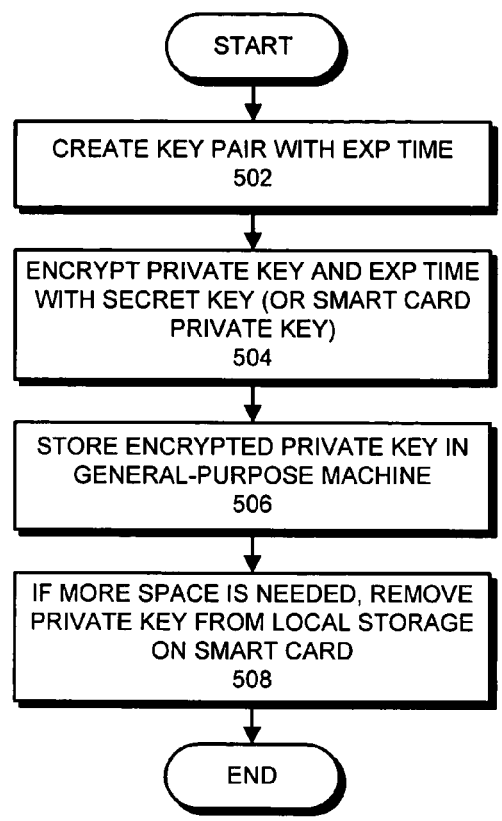
FIG. 4                    FIG. 5

METHOD AND APPARATUS FOR MAINTAINING EPHEMERAL KEYS IN LIMITED SPACE

BACKGROUND

1. Field of the Invention

The present invention relates to techniques for managing keys that are used to encrypt and decrypt data. More specifically, the present invention relates to a method and an apparatus for maintaining keys in a limited amount of space (for example, on a memory-constrained computing device such as a smart card) using auxiliary, less-trusted storage, that can be copied for robustness, in such a way that keys can be deleted, and once deleted, cannot be recovered, even if the copies on auxiliary storage are still available.

2. Related Art

In order to protect sensitive data from unauthorized access, organizations commonly store sensitive data in encrypted form. If the encrypted data needs to be accessed, is must first be decrypted using a decryption key. However, such decryption keys can, over time, be obtained by an adversary through compromise or coercion. To remedy this problem, keys can be stored in tamper-resistant smart cards, in which case it is not feasible to covertly discover the keys.

Unfortunately, smart cards have limited storage space. This is a problem because decryption keys are often private keys (from a private/public key pair) which tend to be quite large. Hence, the limited storage space on a smart card makes it impractical (if not impossible) to store a large number of private keys on the smart card. This restriction significantly limits the capabilities of a system that uses a smart card to manage keys.

Hence, what is needed is a method and an apparatus that can maintain a large number of keys while providing the protection of a smart card.

SUMMARY

One embodiment of the present invention provides a system that maintains keys using limited storage space on a computing device, such as a smart card. During operation, the system receives a request at the computing device to perform an operation involving a key. While processing the request, the system obtains an encrypted key from remote storage located outside of the computing device, wherein the encrypted key was created by encrypting the key along with an expiration time for the key. Next, the system decrypts the encrypted key to restore the key and the expiration time, wherein the encrypted key is decrypted using a computing-device key, which is maintained locally on the computing device. Finally, if the expiration time has not passed, the system uses the key to perform the requested operation. Note that by storing the encrypted key in remote storage, the computing device is able to use the key without consuming local storage space to store the key.

In a variation on this embodiment, prior to receiving the request to perform the operation, the system initializes the encrypted key. This involves encrypting the key and the expiration time for the key to form the encrypted key, so that the encrypted key can be decrypted using the computing-device key. It also involves storing the encrypted key in remote storage. If additional storage space is needed on the computing device, the system removes the key from local storage on the computing device.

In a further variation, initializing the encrypted key additionally involves generating the key on the computing device prior to encrypting the key.

In a variation on this embodiment, obtaining the encrypted key involves either: (1) receiving the encrypted key from remote storage along with the request; or (2) explicitly retrieving the encrypted key from remote storage after receiving the request.

In a variation on this embodiment, the computing-device key is either a private key associated with the computing device, or a symmetric secret key.

Another embodiment of the present invention similarly provides a system that maintains keys using limited storage space on a computing device. During operation, the system receives a request at the computing device to perform an operation involving a key $P_i$. While processing this request, the system obtains an encrypted key $\{P_i\}S_i$ from remote storage located outside of the computing device, wherein $\{P_i\}S_i$ was created by encrypting $P_i$ with a secret key $S_i$. Next, the system retrieves a preceding secret key $S_j$ which is maintained locally on the computing device. The system then derives $S_i$ from $S_j$, whereby $S_i$ can be derived by the computing device instead of having to store $S_i$ on the computing device. Next, the system uses $S_i$ to decrypt $\{P_i\}S_i$, and subsequently uses $P_i$ to perform the requested operation.

In a variation on this embodiment, each key $P_i$ (and its corresponding secret key $S_i$) is associated with an expiration time. When this expiration time passes, the system makes $P_i$ permanently unreadable. This involves first deriving $S_{i+1}$, by applying the one-way function to $S_i$, and then storing $S_{i+1}$ locally on the computing device. The system then discards $S_i$ from the computing device, which renders $P_i$ permanently unreadable.

BRIEF DESCRIPTION OF THE FIGURES

FIG. 4 presents a flow chart illustrating the process of expiring an encrypted key in accordance with an embodiment of the present invention.

FIG. 5 presents a flow chart illustrating the process of encrypting a private key along with an expiration time in accordance with another embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

System

Ideally, we would like to be able to generate tens of thousands of private keys on a smart card, which deletes private keys when they expire. Because private keys cannot be copied from the smart card, we know that once the smart card deletes a private key the private key is unrecoverable.

However, smart cards have very limited storage space. Hence, in one embodiment of the present invention, the smart card encrypts private keys and sends the encrypted private keys to an attached general-purpose machine for storage.

Figure 1:
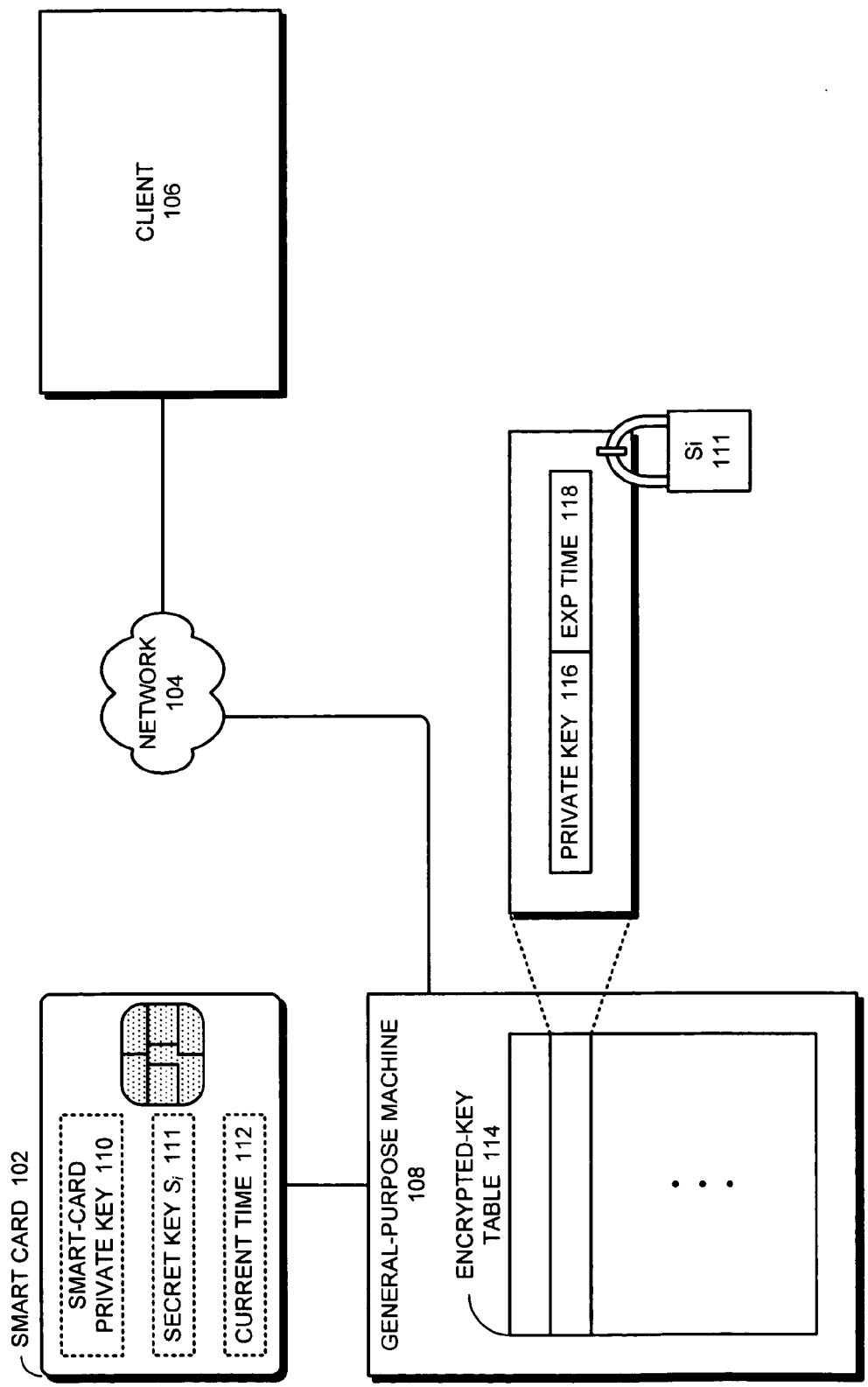
FIG. 1 illustrates a system including a smart card in accordance with an embodiment of the present invention.

For example, FIG. 1 illustrates a system including a smart card 102 which is coupled to a general-purpose machine 108 in accordance with an embodiment of the present invention. As is illustrated in FIG. 1, general-purpose machine communicates with client 106 over network 104. This enables general-purpose machine 108 to service requests from client 106.

Smart card 102 can include any type of tamper-resistant computational device. However, note that the present invention is not limited to systems that use smart cards. In general, the present invention can be applied to any type of computational device or system that saves space by storing encrypted keys in remote storage.

General-purpose machine 108 can include any type of computer system, including, but not limited to, a computer system based on a microprocessor, a mainframe computer, a digital signal processor, a portable computing device, a personal organizer, a device controller, and a computational engine within an appliance.

Network 104 can generally include any type of wired or wireless communication channel capable of coupling together computing nodes. This includes, but is not limited to, a local area network, a wide area network, or a combination of networks. In one embodiment of the present invention, network 104 includes the Internet.

Client 106 can generally include any node on network 104 including computational capability and including a mechanism for communicating across network 104.

During operation, general-purpose machine 108 services requests from client 106. While servicing these requests, general-purpose machine 108 makes requests to smart card 102 to perform various operations that make use of a key, such as encryption and decryption operations. In order to perform these operations, smart card 102 accesses keys that are stored in encrypted-key table 114 on general-purpose machine 108. Each entry in encrypted-key table 114 contains a private key 116 (and possibly an expiration time 118), which are collectively encrypted with secret key $S_i$. Note that although the present invention is described in terms of a system that encrypts private keys, the keys which are encrypted are not necessarily private keys, and may instead be other types of keys, such as symmetric keys. Also note that the expiration time 118 is used by some, but not all embodiments of the present invention. Furthermore, some embodiments of the invention do not maintain a secret key $S_i$ 111 within smart card 102, but alternatively encrypt private keys using smart-card private key 110.

More specifically, smart card 102 maintains a smart card private key 110, which belongs to smart card 102. Smart card 102 also maintains a secret key $S_i$ which can be used to decrypt encrypted private keys as is described in more detail below. Smart card additionally maintains a current time indicator 112, which is used to keep track of the current time. Note that current time indicator 112 can reference an external time base, which is located outside of smart card 102, or alternatively, can reference an internal clock, which keeps track of time within smart card 102.

Encrypting a Key with a Derivable Key

Assume there exists a private key that expires on each date, so there exist a number of private keys $P_1, P_2, \ldots P_n$. Also assume these private keys are generated on smart card 102 whenever a key with a new expiration time is required.

When smart card 102 generates a key pair, it encrypts the private key $P_i$ with a corresponding secret key $S_i$ (we explain how $S_i$ is generated later), and sends it to the general-purpose machine 108, along with the corresponding public key. The corresponding public key and expiration time are then advertised, along with all of the other public keys.

When a client needs to decrypt something encrypted with key i, the client requests decryption with the index "i". The general-purpose machine 108 then retrieves the encrypted $P_i$, and sends it with the message to be decrypted and the index "i" to smart card 102. Smart card 102 then calculates $S_i$, decrypts $P_i$, and performs the requested operation using private key $P_i$.

Although secret keys are smaller than public keys, it would still be impractical for smart card 102 to remember all the $S_i$'s. So instead, each $S_i$ is generated as a one-way hash of the previous $S_i$. This way smart card 102 only has to remember the earliest-to-expire $S_i$, and can "derive" all subsequent $S_i$'s from this earliest-to-expire $S_i$. When $S_i$ expires, smart card 102 calculates $S_{i+1}$, and discards $S_i$.

Figure 2:
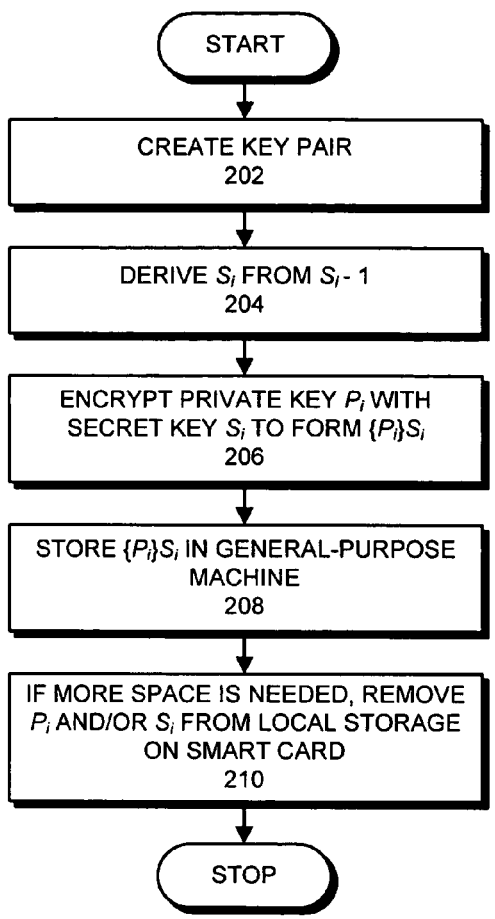
FIG. 2 presents a flow chart illustrating the process of encrypting a private key in accordance with an embodiment of the present invention.

More specifically, FIG. 2 presents a flow chart illustrating the process of encrypting a private key with a derivable key in accordance with an embodiment of the present invention. This process may take place when a request to create a key pair is received from a client, or may automatically take place when a key is needed, or alternatively before a key is needed. First, smart card 102 creates a key pair, which includes a public key and a corresponding private key $P_i$ (step 202). Smart card 102 also uses a one-way function, such as a hash function, to derive a corresponding secret key $S_i$ from a preceding secret key $S_j$, where j<i (step 204). Next, smart card 102 encrypts $P_i$ with $S_i$ to form the encrypted key $\{P_i\}S_i$ (step 206). Smart card 102 then transmits $\{P_i\}S_i$ to general-purpose machine 108 so that general-purpose machine 108 can store $\{P_i\}S_i$ in encrypted key table 114 (step 208). If at some time in the future additional storage space is needed on smart card 102, smart card 102 can remove $S_i$ and/or $P_i$ from local storage on smart card 102 (step 210).

Using the Encrypted Key

Figure 3:
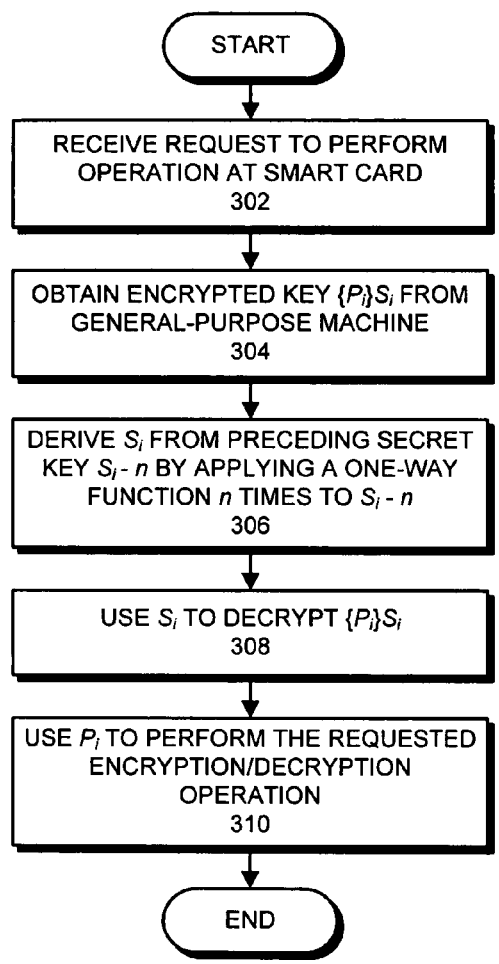
FIG. 3 presents a flow chart illustrating the process of using an encrypted key to perform an operation in accordance with an embodiment of the present invention.

At a later time, the encrypted key may need to be used to perform an operation. For example, FIG. 3 presents a flow chart illustrating the process of using an encrypted key to perform an operation involving a key, such as a decryption or encryption operation, in accordance with another embodiment of the present invention. First, the smart card 102 receives a request (for example, from general-purpose machine 108) to perform an operation involving a key (step 302). Note that this request may be accompanied by data to be decrypted.

Smart card 102 also obtains a corresponding encrypted key $\{P_i\}S_i$ from general-purpose machine 108 (step 304). Note that the encrypted key can be received from the general-purpose machine 108 along with the request, or alternatively, smart card 102 can retrieve the encrypted key from general-purpose machine 108 after receiving the request.

Smart card 102 then derives $S_i$, if necessary, from a preceding secret key $S_{i-n}$ by applying a one-way function, such as a hash, n times to $S_{i-n}$ (step 306). Smart card 102 then uses $S_i$ to decrypt $\{P_i\}S_j$ (step 308), and uses $P_i$ to perform the requested operation (step 310). Note that this operation can involve decrypting or encrypting a piece of data using $P_i$, or possibly generating a digital signature using the key $P_i$.

Expiring an Encrypted Key

FIG. 4 presents a flow chart illustrating the process of expiring an encrypted key in accordance with an embodiment of the present invention. In this embodiment, the key $P_i$ is associated with an expiration time. Smart card 102 first determines if the expiration time for $P_i$ has passed (step 402). If not, smart card 102 keeps checking. Otherwise, if the expiration time has passed, the smart card 102 derives $S_{i+1}$ from $S_i$ using the one-way function (step 404). Smart card 102 then stores $S_{i+1}$ in local storage (step 406) and discards $S_i$ (step 408). Note that discarding $S_i$ makes it impossible to decrypt $\{P_i\}S_i$ and hence makes $P_i$ permanently unreadable.

Trading Off Computation and Memory

There are various ways of trading off computation and memory while calculating $S_i$'s in smart card 102. It might be too slow to calculate a secret key thousands of time units removed from the current $S_i$, because that would involve thousands of hashes. So instead, smart card 102 might remember some of the intermediate $S_i$'s, and just calculate from the nearest one. Or, there could be different hash functions that allow one to skip ahead. For instance, a first hash function might go from $S_i$ to $S_{i+1}$ to $S_{i+2}$ but a second hash function might go from $S_i$ to $S_{i+100}$ to $S_{i+200}$. Hence, smart card 102 might remember k secrets, and have k hash functions, and use the secrets and the hash functions to derive S by first calculating with the hash function that does the largest jump, then the next largest, and so forth.

Encrypting a Key and an Expiration Time

In this alternative embodiment, smart card 102 maintains only one secret key S. When it generates a new key pair with private key $P_i$, it encrypts the combination of $P_i$ and a corresponding expiration time $T_{exp}$ with S. When general-purpose machine 108 requests that smart card 102 perform a decryption operation, it sends the encrypted key $\{P_i, T_{exp}\}S$, which is encrypted along with the expiration time $T_{exp}$. Smart card 102 decrypts $\{P_i, T_{exp}\}S$, and checks that the expiration time $T_{exp}$ has not passed. If the expiration time has passed, smart card 102 refuses to perform the decryption.

Note that this alternative solution is more efficient than encrypting with the derivable secret keys as is described in the previous embodiment. However, this alternative solution is perhaps less secure because the expired keys are in theory still available, and we have to depend on the smart card to not use expired keys. However, given that S and the encrypted private key still exist after the expiration time, there might possibly be a way of breaking the smart card. Furthermore, this alternative technique is more efficient since smart card 102 needs only to remember one secret key S, and does not need to perform lots of hashes.

More specifically, FIG. 5 presents a flow chart illustrating the process of encrypting a private key along with an expiration time in accordance with an embodiment of the present invention. First, smart card 102 creates a key pair, which includes a public key and a corresponding private key $P_i$ (step 502). Next, smart card 102 encrypts $P_i$ and the corresponding expiration time $T_{exp}$ with the secret key S to form the encrypted key $\{P_i, T_{exp}\}S$ (step 504). Smart card 102 then transmits $\{P_i, T_{exp}\}S$ to general-purpose machine 108 so that general-purpose machine 108 can store $\{P_i, T_{exp}\}S$ in encrypted key table 114 (step 506). If at some time in the future additional storage space is needed on smart card 102, smart card 102 can remove $P_i$ from local storage on smart card 102 (step 508).

Using the Encrypted Key and Expiration Time

Figure 6:
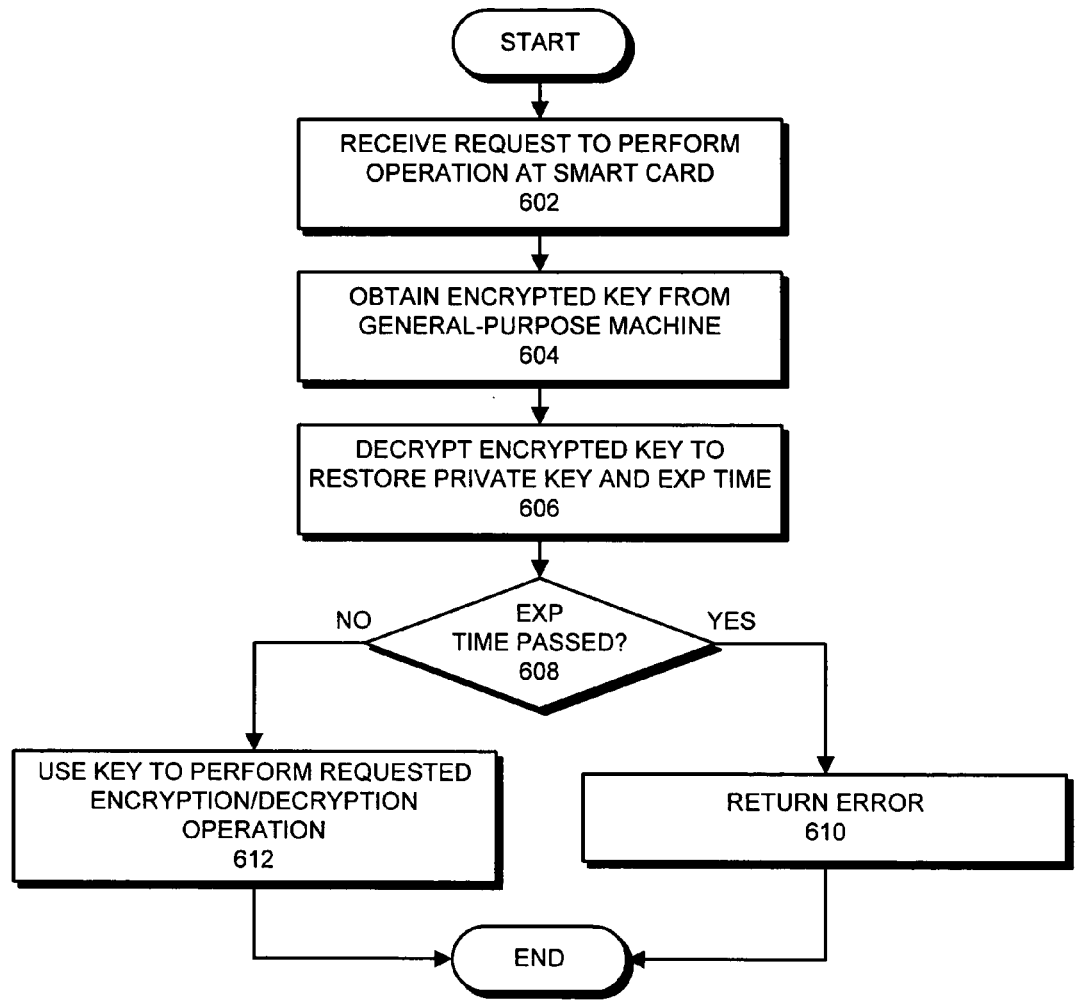
FIG. 6 presents a flow chart illustrating the process of using an encrypted key to perform an operation in accordance with another embodiment of the present invention.

FIG. 6 presents a flow chart illustrating the process of using an encrypted key to perform an operation in accordance with an embodiment of the present invention. First, smart card 102 receives a request to perform an operation, such as a decryption operation (step 602).

While processing this request, smart card 102 also obtains an encrypted form of the corresponding key and expiration time $\{P_i, T_{exp}\}S$ from general-purpose machine 108 (step 604). Note $\{P_i, T_{exp}\}S$ can be received from the general-purpose machine 108 along with the request, or alternatively, smart card 102 can retrieve it from general-purpose machine 108 after receiving the request.

Next, smart card 102 uses S to decrypt $\{P_i, T_{exp}\}S$ (step 606). Smart card 102 then determines if expiration time $T_{exp}$ has passed (step 608). If so, smart card 102 returns an error (step 610). Otherwise, if expiration time $T_{exp}$ has not passed, smart card 102 uses $P_i$ to perform the requested operation (step 612).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for maintaining keys using limited storage space on a computing device, comprising:

receiving a request at the computing device to perform an operation involving a key;

obtaining an encrypted key from remote storage located outside of the computing device, wherein the encrypted key was created by encrypting the key along with an expiration time for the key;

decrypting the encrypted key to restore the key and the expiration time, wherein the encrypted key is decrypted using a computing-device key, which is maintained locally on the computing device;

determining at the computing-device if the expiration time has passed; and if the expiration time has not passed, using the key to perform the requested operation;

whereby maintaining the encrypted key in remote storage enables the computing device to use the key without consuming local storage space to store the key.

2. The method of claim 1, wherein prior to receiving the request to perform the operation, the method further comprises initializing the encrypted key by:

encrypting the key and the expiration time for the key to form the encrypted key, so that the encrypted key can be decrypted using the computing-device key;

storing the encrypted key in remote storage; and if additional storage space is needed on the computing device, removing the key from local storage on the computing device.

3. The method of claim 1, wherein initializing the encrypted key additionally involves generating the key on the computing device prior to encrypting the key.

4. The method of claim 1, wherein obtaining the encrypted key involves:

receiving the encrypted key from remote storage along with the request; or explicitly retrieving the encrypted key from remote storage after receiving the request.

5. The method of claim 1, wherein the computing-device key is:

a private key associated with the computing device; or a symmetric secret key.

6. A method for maintaining keys using limited storage space on a computing device, comprising:

receiving at the computing device a request from a client to perform an operation involving a key $P_i$;

obtaining an encrypted key $\{P_i\}S_i$ from remote storage located outside of the computing device, wherein $\{P_i\}S_i$ was created by encrypting $P_i$ with a secret key $S_i$;

retrieving a preceding secret key $S_j$ which is maintained locally on the computing device, wherein $S_j$ is secret to the computing device and is not maintained on the client;

deriving $S_i$ from $S_j$, whereby $S_i$ can be derived by the computing device instead of having to store $S_i$ on the computing device;

using $S_i$ to decrypt $\{P_i\}S_i$ thereby restoring $P_i$; and using $P_i$ to perform the requested operation;

whereby maintaining $\{P_i\}S_i$ in remote storage enables the computing device to use $P_i$ without consuming local storage space to store $P_i$.

7. The method of claim 6, wherein each key $P_i$ and corresponding secret key $S_i$ is associated with an expiration time, and wherein when the expiration time for key $P_i$ expires, the method further comprises:

replacing $S_i$ with a new secret from which all future S's can be derived;

storing the new secret locally on the computing device; and discarding $S_i$ from the computing device, whereby the corresponding key $P_i$ becomes permanently unreadable.

8. The method of claim 6, wherein prior to receiving the request to perform the operation, the method further comprises initializing the encrypted key $\{P_i\}S_i$ by:

encrypting $P_i$ with $S_i$ to form $\{P_i\}S_i$;

storing $\{P_i\}S_i$ in remote storage; and if additional storage space is needed on the computing device, removing $P_i$ from local storage on the computing device.

9. The method of claim 8, wherein initializing the encrypted key $\{P_i\}S_i$ additionally involves generating $P_i$ on the computing device prior to encrypting $P_i$.

10. The method of claim 6, wherein obtaining the encrypted key $\{P_i\}S_i$ involves:

receiving $\{P_i\}S_i$ from remote storage along with the request; or explicitly retrieving $\{P_i\}S_i$ from remote storage after receiving the request.

11. A computer-readable storage medium storing instructions that when executed by a computer cause the computer to perform a method for maintaining keys using limited storage space on a computing device, comprising:

receiving a request at the computing device to perform an operation involving a key;

obtaining an encrypted key from remote storage located outside of the computing device, wherein the encrypted key was created by encrypting the key along with an expiration time for the key;

decrypting the encrypted key to restore the key and the expiration time, wherein the encrypted key is decrypted using a computing-device key, which is maintained locally on the computing device;

determining at the computing-device if the expiration time has passed; and if the expiration time has not passed, using the key to perform the requested operation;

whereby maintaining the encrypted key in remote storage enables the computing device to use the key without consuming local storage space to store the key.

12. The computer-readable storage medium of claim 11, wherein prior to receiving the request to perform the operation, the method further comprises initializing the encrypted key by:

encrypting the key and the expiration time for the key to form the encrypted key, so that the encrypted key can be decrypted using the computing-device key;

storing the encrypted key in remote storage; and if additional storage space is needed on the computing device, removing the key from local storage on the computing device.

13. The computer-readable storage medium of claim 11, wherein initializing the encrypted key additionally involves generating the key on the computing device prior to encrypting the key.

14. The computer-readable storage medium of claim 11, wherein obtaining the encrypted key involves:

receiving the encrypted key from remote storage along with the request; or explicitly retrieving the encrypted key from remote storage after receiving the request.

15. The computer-readable storage medium of claim 11, wherein the computing-device key is:

a private key associated with the computing device; or a symmetric secret key.

16. A computer-readable storage medium storing instructions that when executed by a computer cause the computer to perform a method for maintaining keys using limited storage space on a computing device, comprising:

receiving at the computing device a request from a client to perform an operation involving a key $P_i$;

obtaining an encrypted key $\{P_i\}S_i$ from remote storage located outside of the computing device, wherein $\{P_i\}S_i$ was created by encrypting $P_i$ with a secret key $S_i$;

retrieving a preceding secret key $S_j$ which is maintained locally on the computing device, wherein $S_j$ is secret to the computing device and is not maintained on the client;

deriving $S_i$ from $S_j$, whereby $S_i$ can be derived by the computing device instead of having to store $S_i$ on the computing device;

using $S_i$ to decrypt $\{P_i\}S_i$ thereby restoring $P_i$; and using $P_i$ to perform the requested operation;

whereby maintaining $\{P_i\}S_i$ in remote storage enables the computing device to use $P_i$ without consuming local storage space to store $P_i$.

17. The computer-readable storage medium of claim 16, wherein each key $P_i$ and corresponding secret key $S_i$ is associated with an expiration time, and wherein when the expiration time for key $P_i$ expires, the method further comprises:
  replacing $S_i$ with a new secret from which all future S's can be derived;
  storing the new secret locally on the computing device; and
  discarding $S_i$ from the computing device, whereby the corresponding key $P_i$ becomes permanently unreadable.

18. The computer-readable storage medium of claim 16, wherein prior to receiving the request to perform the operation, the method further comprises initializing the encrypted key $\{P_i\}S_i$ by:
  encrypting $P_i$ with $S_i$ to form $\{P_i\}S_i$;
  storing $\{P_i\}S_i$ in remote storage; and
  if additional storage space is needed on the computing device, removing $P_i$ from local storage on the computing device.

19. The computer-readable storage medium of claim 18, wherein initializing the encrypted key $\{P_i\}S_i$ additionally involves generating $P_i$ on the computing device prior to encrypting $P_i$.

20. The computer-readable storage medium of claim 16, wherein obtaining the encrypted key $\{P_i\}S_i$ involves:
  receiving $\{P_i\}S_i$ from remote storage along with the request; or
  explicitly retrieving $\{P_i\}S_i$ from remote storage after receiving the request.

21. A computing device that maintains keys using limited storage space, comprising:
  the computing device;
  a receiving mechanism within the computing device configured to receive a request to perform an operation involving a key;
  wherein the receiving mechanism is configured to receive an encrypted key from remote storage located outside of the computing device, wherein the encrypted key was created by encrypting the key along with an expiration time for the key;
  a key-decryption mechanism within the computing device configured to decrypt the encrypted key to restore the key and the expiration time, wherein the encrypted key is decrypted using a computing-device key, which is maintained locally on the computing device; and
  an operation-processing mechanism within the computing device, wherein the operation-processing mechanism is configured to determine if the expiration time has passed and, if the expiration time has not passed, the operation-processing mechanism is configured to use the key to perform the requested operation;
  whereby maintaining the encrypted key in remote storage enables the computing device to use the key without consuming local storage space to store the key.

22. A computing device that maintains keys using limited storage space, comprising:
  the computing device;
  a receiving mechanism within the computing device configured to receive from a client a request to perform an operation involving a key $P_i$;
  wherein the receiving mechanism is configured to receive an encrypted key $\{P_i\}S_i$ from remote storage located outside of the computing device, wherein $\{P_i\}S_i$ was created by encrypting $P_i$ with a secret key $S_i$;
  a key-generation mechanism within the computing device, which is configured to,
    retrieve a preceding secret key $S_j$ which is maintained locally on the computing device, wherein $S_j$ is secret to the computing device and is not maintained on the client;
    derive $S_i$ from $S_j$, whereby $S_i$ can be derived by the computing device instead of having to store $S_i$ on the computing device;
  a key-decryption mechanism within the computing device configured to use $S_i$ to decrypt $\{P_i\}S_i$ thereby restoring $P_i$, and
  an operation-processing mechanism within the computing device, which is configured to use $P_i$ to perform the requested operation;
  whereby maintaining $\{P_i\}S_i$ in remote storage enables the computing device to use $P_i$ without consuming local storage space to store $P_i$.

* * * * *

UNITED STATES PATENT AND TRADEMARK OFFICE
CERTIFICATE OF CORRECTION

PATENT NO. : 7,660,423 B2  Page 1 of 1
APPLICATION NO. : 11/325203
DATED : February 9, 2010
INVENTOR(S) : Radia J. Perlman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this

Thirtieth Day of November, 2010

David J. Kappos
*Director of the United States Patent and Trademark Office*